(No Model.)

H. W. DIEK.
CHRISTMAS TREE HOLDER.

No. 417,815. Patented Dec. 24, 1889.

Witnesses:
N. W. Mortimer
F. Stanley Elmore

Inventor:
H. W. Diek
By Phil T. Dodge
Atty

UNITED STATES PATENT OFFICE.

HENRY W. DIEK, OF BALTIMORE, MARYLAND.

CHRISTMAS-TREE HOLDER.

SPECIFICATION forming part of Letters Patent No. 417,815, dated December 24, 1889.

Application filed October 15, 1889. Serial No. 327,052. (No model.)

*To all whom it may concern:*

Be it known that I, HENRY W. DIEK, of Baltimore, in the State of Maryland, have invented certain Improvements in Christmas-Tree Holders, of which the following is a specification.

The object of my invention is to provide a simple and inexpensive device by means of which Christmas-trees may be firmly maintained in an upright position and the foliage preserved in its green condition.

To this end it consists, essentially, in a body or socket of any appropriate form adapted to receive the base of the tree and to hold water or other fluid, and provided with means for clamping the tree in position therein, and also, when required, with means for attaching the device to the floor or other support.

The essential features of my socket are a cup, socket, or body of any suitable form and construction which will receive the body of the tree and retain water or other fluid, in which the base is immersed, and clamping devices of any appropriate form for securing the tree in position.

Figure 1:
Figure 3:
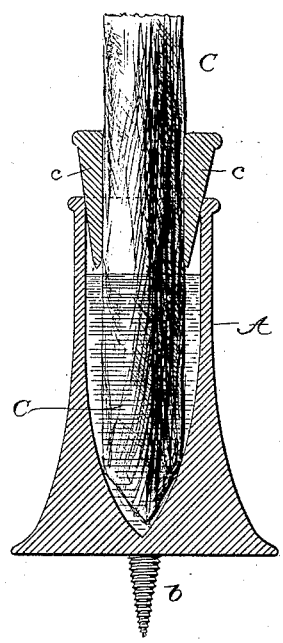
Figure 2:
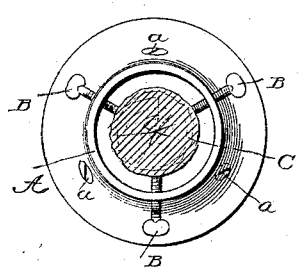

In the accompanying drawings, Figure 1 is a vertical central section through my holder in its preferred form with a tree therein. Fig. 2 is a top plan view of the same. Fig. 3 is a vertical transverse section through the holder in a modified form.

Referring to the drawings, Figs. 1 and 2, A represents a cup-like body or socket cast complete in one piece with a broad base provided with holes to receive fastening-screws $a$, by which it may be fixed in position upon the floor. The chamber within the body is adapted to hold water, and is preferably made of conical or converging form at the lower end in order to center the tree when seated therein. At its upper end the body is provided with three or more radial screws B, tapped through its sides, and adapted to bear at their inner ends against the trunk of the tree C. By means of these screws the tree may be fixed firmly in an erect position.

Referring to Fig. 3, A represents a cup-like body, similar to that in the preceding figures, but differing therefrom in that it is provided with a central screw $b$, fixed firmly thereto. This screw, which may be turned into the floor or other support by turning the body, will serve to hold the latter in position. In this form of the device I employ a series of wedges $c$, as substitutes for the screws shown in the first form. It is to be distinctly understood, however, that in place of the screws or wedges any other appropriate means of clamping the tree may be employed.

The vessel to hold the water may be removably inserted within the body, but it is preferred to cast the device complete in one piece, as shown.

The employment of my contrivance is advantageous not only in that it maintains the tree firmly in position, but also in that the water supplied thereto serves to prevent the foliage from drying or materially changing color. In other words, it is maintained in such condition that there is no danger of its being accidentally ignited or of the fibers or needles falling therefrom.

If desired, the fastening devices at the base of the holder may be omitted and the base suitably expanded or provided with sustaining-feet to maintain it in position, in either of which cases the screws or other fastenings may be omitted.

Having thus described my invention, what I claim is—

1. A holder for Christmas-trees, consisting of a body or socket provided with clamping devices to hold the tree and with a chamber or receptacle to hold water.

2. A holder for Christmas-trees, consisting of a body adapted to receive the tree and adapted to hold water, clamping devices to hold the tree therein, and means for securing the body to a floor or other support.

In testimony whereof I hereunto set my hand, this 12th day of October, 1889, in the presence of two attesting witnesses.

HENRY W. DIEK.

Witnesses:
W. R. KENNEDY,
F. STANLY ELMORE.